United States Patent
Unno et al.

(10) Patent No.: US 10,139,020 B2
(45) Date of Patent: Nov. 27, 2018

(54) LOW TEMPERATURE FLUID DUAL STRUCTURE PIPE AND LOW TEMPERATURE FLUID DUAL STRUCTURE STORAGE TANK

(71) Applicant: KAWASAKI JUKOGYO KABUSHIKI KAISHA, Kobe-shi, Hyogo (JP)

(72) Inventors: Shuntaro Unno, Kobe (JP); Tomonori Takase, Kakogawa (JP); Tomoaki Umemura, Kobe (JP); Eiji Kawagoe, Misato (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/515,757

(22) PCT Filed: Sep. 29, 2015

(86) PCT No.: PCT/JP2015/004933
§ 371 (c)(1),
(2) Date: Mar. 30, 2017

(87) PCT Pub. No.: WO2016/051769
PCT Pub. Date: Apr. 7, 2016

(65) Prior Publication Data
US 2017/0307112 A1    Oct. 26, 2017

(30) Foreign Application Priority Data
Sep. 30, 2014   (JP) .................................. 2014-200615

(51) Int. Cl.
*F16L 9/18*      (2006.01)
*F16L 59/065*    (2006.01)
(Continued)

(52) U.S. Cl.
CPC ............... *F16L 9/18* (2013.01); *F16L 59/065* (2013.01); *F16L 59/12* (2013.01); *F16L 59/141* (2013.01)

(58) Field of Classification Search
CPC ....................................... F16L 9/18; F16L 9/14
(Continued)

(56) References Cited

U.S. PATENT DOCUMENTS 4,924,679 A  *  5/1990  Brigham ............... F16L 59/141
                                                        62/384
6,216,745 B1 *  4/2001  Augustynowicz .... F16L 59/065
                                                        138/114
(Continued)

FOREIGN PATENT DOCUMENTS

JP   H08-15397 A      1/1996
JP   2012-251606 A    12/2012
JP   2013-228060 A    11/2013

OTHER PUBLICATIONS

Dec. 28, 2015 Search Report issued in International Patent Application No. PCT/JP2015/004933.
(Continued)

*Primary Examiner* — Patrick F Brinson
(74) *Attorney, Agent, or Firm* — Oliff PLC (57) ABSTRACT

A low temperature fluid dual structure pipe includes: an inner pipe through which a low temperature fluid flows; and an outer pipe externally fitted to the inner pipe with a sealed tubular space therebetween. An inactive gas having a melting point and a boiling point each of which is equal to or higher than a temperature of the low temperature fluid is filled in the tubular space between the inner pipe and the outer pipe. When the low temperature fluid flows through the inner pipe, the inactive gas is liquefied or solidified, and therefore, at least one of a liquefied inactive gas layer and a solidified inactive gas layer is formed on an outer peripheral (Continued)

surface of the inner pipe. As a result, a pseudo vacuum layer that is in a substantially vacuum state is formed in the tubular space.

8 Claims, 4 Drawing Sheets

(51) Int. Cl.
*F16L 59/14* (2006.01)
*F16L 59/12* (2006.01)

(58) Field of Classification Search
USPC .......................................... 138/114, 149, 148
See application file for complete search history.

(56) References Cited

U.S. PATENT DOCUMENTS 7,305,837 B2 * 12/2007 White .................... F16L 59/141
                                                                                                        138/148
8,893,748 B2 * 11/2014 Malas .................... F16L 59/141
                                                                                                        138/114

OTHER PUBLICATIONS

Dec. 28, 2015 Written Opinion issued in International Patent Application No. PCT/JP2015/004933.

* cited by examiner

LOW TEMPERATURE FLUID DUAL STRUCTURE PIPE AND LOW TEMPERATURE FLUID DUAL STRUCTURE STORAGE TANK

TECHNICAL FIELD

The present invention relates to a low temperature fluid dual structure pipe and a low temperature fluid dual structure storage tank, particularly to a pipe and storage tank each having a simple heat insulation structure and capable of transferring or storing a low temperature liquefied gas.

BACKGROUND ART

In the case of a single pipe through which a low temperature fluid such as LPG or LNG flows, a heat insulation structure in which a heat insulating material such as a foaming body covers an outer periphery side of the single pipe has been widely adopted. However, when a low temperature liquefied gas (such as liquefied helium, liquefied hydrogen, liquefied nitrogen, or liquefied oxygen) having an extremely low temperature flows through the single pipe, the above heat insulation structure is inadequate. Therefore, practically used is a vacuum heat insulation dual structure pipe in which: a vacuum layer is formed between an inner pipe and an outer pipe for preventing convective heat transfer; and a heat insulating effect by this vacuum layer is utilized.

For example, a supply pipe (low temperature fluid dual structure pipe) described in PTL 1 is constituted by a FRP inner pipe and a FRP outer pipe and adopts a heat insulation structure which prevents vaporization of liquefied helium flowing through the inner pipe in such a manner that: nonwoven fabric on which aluminum is deposited is wound around an outer peripheral surface of the inner pipe; and a vacuum layer is formed between the inner pipe and the outer pipe.

As with the above dual structure pipe, as a gas storage tank for storing the low temperature fluid, a vacuum heat insulation dual structure storage tank is generally known, which is constituted by an inner tank storing the low temperature fluid and an outer tank externally fitted to the inner tank with a space therebetween and includes a vacuum layer formed in the space between the inner tank and the outer tank.

CITATION LIST

Patent Literature

PTL 1: Japanese Laid-Open Patent Application Publication No. 8-15397

SUMMARY OF INVENTION

Technical Problem

To form the vacuum layer in a tubular space between the inner pipe and the outer pipe in the conventional vacuum heat insulation dual structure pipe, air needs to be discharged from the tubular space by utilizing a vacuum pump, that is, vacuum drawing needs to be performed. Thus, there is a problem that a large amount of labor and cost are required to form the vacuum layer. Other vacuum heat insulation dual structure bodies, such as the dual structure storage tank, have the same problem as above.

An object of the present invention is to provide a low temperature fluid dual structure pipe and a low temperature fluid dual structure storage tank each having a simple vacuum heat insulation dual structure.

Solution to Problem

To solve the above problems, a low temperature fluid dual structure pipe according to the present invention includes: an inner pipe through which a low temperature fluid flows; and an outer pipe externally fitted to the inner pipe with a sealed tubular space therebetween, wherein: an inactive gas having a melting point and a boiling point each of which is equal to or higher than a temperature of the low temperature fluid is filled in the tubular space between the inner pipe and the outer pipe; and when the low temperature fluid flows through the inner pipe, the inactive gas is liquefied or solidified, and therefore, at least one of a liquefied inactive gas layer and a solidified inactive gas layer is formed on an outer peripheral surface of the inner pipe, and as a result, a pseudo vacuum layer that is in a substantially vacuum state is formed in the tubular space.

According to the above low temperature fluid dual structure pipe, the inactive gas having the melting point and the boiling point each of which is equal to or higher than the temperature of the low temperature fluid is filled in the tubular space between the inner pipe and the outer pipe. When the low temperature fluid flows through the inner pipe, the inactive gas is liquefied or solidified, and therefore, at least one of the liquefied inactive gas layer and the solidified inactive gas layer is formed on the outer peripheral surface of the inner pipe. As a result, the pseudo vacuum layer that is in a substantially vacuum state is formed in the tubular space. On this account, by the pseudo vacuum layer having a simple structure, convective heat transfer in the tubular space can be prevented, and the heat insulation performance can be secured.

When the low temperature fluid flows through the inner pipe, the inactive gas filled in the tubular space and having the melting point and the boiling point each of which is equal to or higher than the temperature of the low temperature fluid is cooled and therefore liquefied or solidified. Then, the liquefied or solidified inactive gas coagulates on or adheres on the outer peripheral surface of the inner pipe to form at least one of the liquefied inactive gas layer and the solidified inactive gas layer. Therefore, a pseudo vacuum state in the tubular space can be easily realized without using a vacuum pump.

When the low temperature fluid does not flow through the inner pipe, an inactive gas layer formed by the inactive gas is formed in the tubular space between the inner pipe and the outer pipe. Therefore, gas pressure acts on the outer pipe from inside, so that intrusion of outside air into the outer pipe can be prevented. Further, after the damaged low temperature fluid dual structure pipe is repaired, it is only necessary to fill the tubular space between the inner pipe and the outer pipe with the inactive gas. Therefore, labor and cost can be reduced as compared to a case where vacuum drawing is performed.

The above low temperature fluid dual structure pipe may further include a receiving member provided between the inner pipe and the outer pipe to receive at least one of a liquefied inactive gas dropping from the liquefied inactive gas layer formed on the outer peripheral surface of the inner pipe and a solidified inactive gas coming off from the solidified inactive gas layer formed on the outer peripheral surface of the inner pipe. According to this configuration, the low temperature fluid dual structure pipe includes the receiving member provided between the inner pipe and the outer pipe to receive at least one of the liquefied inactive gas dropping from the liquefied inactive gas layer formed on the outer peripheral surface of the inner pipe and the solidified inactive gas coming off from the solidified inactive gas layer formed on the outer peripheral surface of the inner pipe. Therefore, at least one of the liquefied inactive gas and the solidified inactive gas can be prevented from directly contacting the outer pipe subjected to normal temperature, and the deterioration of the vacuum state of the pseudo vacuum layer by vaporization of at least one of the liquefied inactive gas and the solidified inactive gas can be prevented.

In the above low temperature fluid dual structure pipe, the receiving member may be provided under the inner pipe so as to be heat-exchangeable with the inner pipe. According to this configuration, the receiving member is provided under the inner pipe so as to be heat-exchangeable with the inner pipe. Therefore, the receiving member can surely receive at least one of the liquefied inactive gas dropping downward from the liquefied inactive gas layer formed on the outer peripheral surface of the inner pipe and the solidified inactive gas coming off from the solidified inactive gas layer formed on the outer peripheral surface of the inner pipe. Further, since the receiving member is cooled by the low temperature fluid through heat exchange with the inner pipe, the vaporization of at least one of the liquefied inactive gas and the solidified inactive gas received by the receiving member can be prevented.

In the above low temperature fluid dual structure pipe, the receiving member may include a plurality of annular receiving trays which are provided at the outer peripheral portion of the inner pipe at appropriate intervals in a length direction of the inner pipe extending in a vertical direction, inner peripheral edges of the plurality of annular receiving trays being fixed to the outer peripheral portion of the inner pipe. According to this configuration, the receiving member is constituted by the plurality of annular receiving trays which are provided at the outer peripheral portion of the inner pipe at appropriate intervals in the length direction of the inner pipe extending in the vertical direction, the inner peripheral edges of the plurality of annular receiving trays being fixed to the outer peripheral portion of the inner pipe. Therefore, the annular receiving trays can surely receive at least one of the liquefied inactive gas dropping along the outer peripheral surface of the inner pipe from the liquefied inactive gas layer formed on the outer peripheral surface of the inner pipe and the solidified inactive gas coming off along the outer peripheral surface of the inner pipe from the solidified inactive gas layer formed on the outer peripheral surface of the inner pipe.

In the above low temperature fluid dual structure pipe, the low temperature fluid may be any of liquefied helium and liquefied hydrogen, and the inactive gas may be carbon dioxide. According to this configuration, the low temperature fluid is any of the liquefied helium or the liquefied hydrogen, and the inactive gas is the carbon dioxide. Therefore, when the inner pipe is cooled by the low temperature fluid flowing therethrough, solid carbon dioxide is formed on the outer peripheral surface of the inner pipe. On this account, peel-off of the solid carbon dioxide hardly occurs, and contact between the solid carbon dioxide and the outer pipe does not occur.

A low temperature fluid dual structure storage tank according to the present invention includes: an inner tank configured to store a low temperature fluid; and an outer tank externally fitted to the inner tank with a sealed space therebetween, wherein: an inactive gas having a melting point and a boiling point each of which is equal to or higher than a temperature of the low temperature fluid is filled in the space between the inner tank and the outer tank; and when the low temperature fluid is stored in the inner tank, the inactive gas is liquefied or solidified, and therefore, at least one of a liquefied inactive gas layer and a solidified inactive gas layer is formed on an outer peripheral surface of the inner tank, and as a result, a pseudo vacuum layer that is in a substantially vacuum state is formed in the sealed space.

According to the above low temperature fluid dual structure storage tank, the inactive gas having the melting point and the boiling point each of which is equal to or higher than the temperature of the low temperature fluid is filled in the space between the inner tank and the outer tank. The low temperature fluid is stored in the inner tank, so that the inactive gas is liquefied or solidified, and therefore, at least one of the liquefied inactive gas layer and the solidified inactive gas layer is formed on the outer peripheral surface of the inner tank. As a result, the pseudo vacuum layer that is in a substantially vacuum state is formed in the space. Therefore, by the pseudo vacuum layer having a simple structure, the convective heat transfer in the sealed space can be prevented, and the heat insulation performance can be secured.

Advantageous Effects of Invention

The present invention can provide a low temperature fluid dual structure pipe and a low temperature fluid dual structure storage tank each having a simple vacuum heat insulation dual structure.

DESCRIPTION OF EMBODIMENTS

Hereinafter, embodiments of the present invention will be explained.

Embodiment 1

First, an entire structure of a low temperature fluid dual structure pipe 1 will be explained.

As shown in FIGS. 1 to 5, the low temperature fluid dual structure pipe 1 includes an inner pipe 2 and an outer pipe 3 externally fitted to the inner pipe 2 with a sealed tubular space therebetween. In the low temperature fluid dual structure pipe 1, a low temperature fluid 4 (such as liquefied helium or liquefied hydrogen) flows through the inner pipe 2, and a pseudo vacuum layer 5 that is in a substantially vacuum state is formed in the tubular space between the inner pipe 2 and the outer pipe 3.

Each of the inner pipe 2 and the outer pipe 3 is formed by using, for example, a material pipe made of stainless steel or aluminum alloy. A size of the inner pipe 2 is, for example, about six inches, and a size of the outer pipe 3 is, for example, about eight inches. A thickness of a pipe wall of each of the inner pipe 2 and the outer pipe 3 is, for example, 1.0 to 3.0 mm. It should be noted that these numerical values are just examples, and the present embodiment is not limited to these numerical values.

Although not shown, a super insulation for blocking radiation heat is wound around an outer periphery side of the inner pipe 2.

An inactive gas (such as carbon dioxide or nitrogen gas) having a melting point and a boiling point each of which is equal to or higher than a temperature of the low temperature fluid 4 is filled in the tubular space between the inner pipe 2 and the outer pipe 3. When the low temperature fluid 4 flows through the inner pipe 2, the inactive gas is liquefied or solidified, and therefore, at least one of a liquefied inactive gas layer 6a and a solidified inactive gas layer 6b is formed on an outer peripheral surface of the inner pipe 2. As a result, the pseudo vacuum layer 5 is formed. In a case where the entire inactive gas is solidified on the outer peripheral surface of the inner pipe 2, a thickness of the solidified inactive gas layer 6b is, for example, in a range of about 0.02 to 0.05 mm, and pressure of the pseudo vacuum layer 5 is, for example, in a range of about $4.0 \times 10^{-7}$ to $7.0 \times 10^{-8}$ Pa, but the present embodiment is not necessarily limited to these ranges.

When the low temperature fluid 4 flows through the inner pipe 2, the pseudo vacuum layer 5 is formed in the tubular space. On the other hand, when the low temperature fluid 4 does not flow through the inner pipe 2, an inactive gas layer of the inactive gas having the melting point and the boiling point each of which is equal to or higher than the temperature of the low temperature fluid 4 flowing through the inner pipe 2 is formed in the tubular space.

The low temperature fluid 4 is, for example, any of liquefied helium and liquefied hydrogen, but is not limited to these and may be a gas-liquid two-phase fluid of the above liquefied gas. Carbon dioxide is preferable as the inactive gas having the melting point and the boiling point each of which is equal to or higher than the temperature of the low temperature fluid 4. However, the other inactive gas may be adopted depending on the type of the low temperature fluid 4. It should be noted that since carbon dioxide is hardly liquefied but is solidified, carbon dioxide has an effect of being hardly peeled off from the outer peripheral surface of the inner pipe as compared to the other inactive gases.

Next, a receiving member 7 will be explained.

Figure 1:
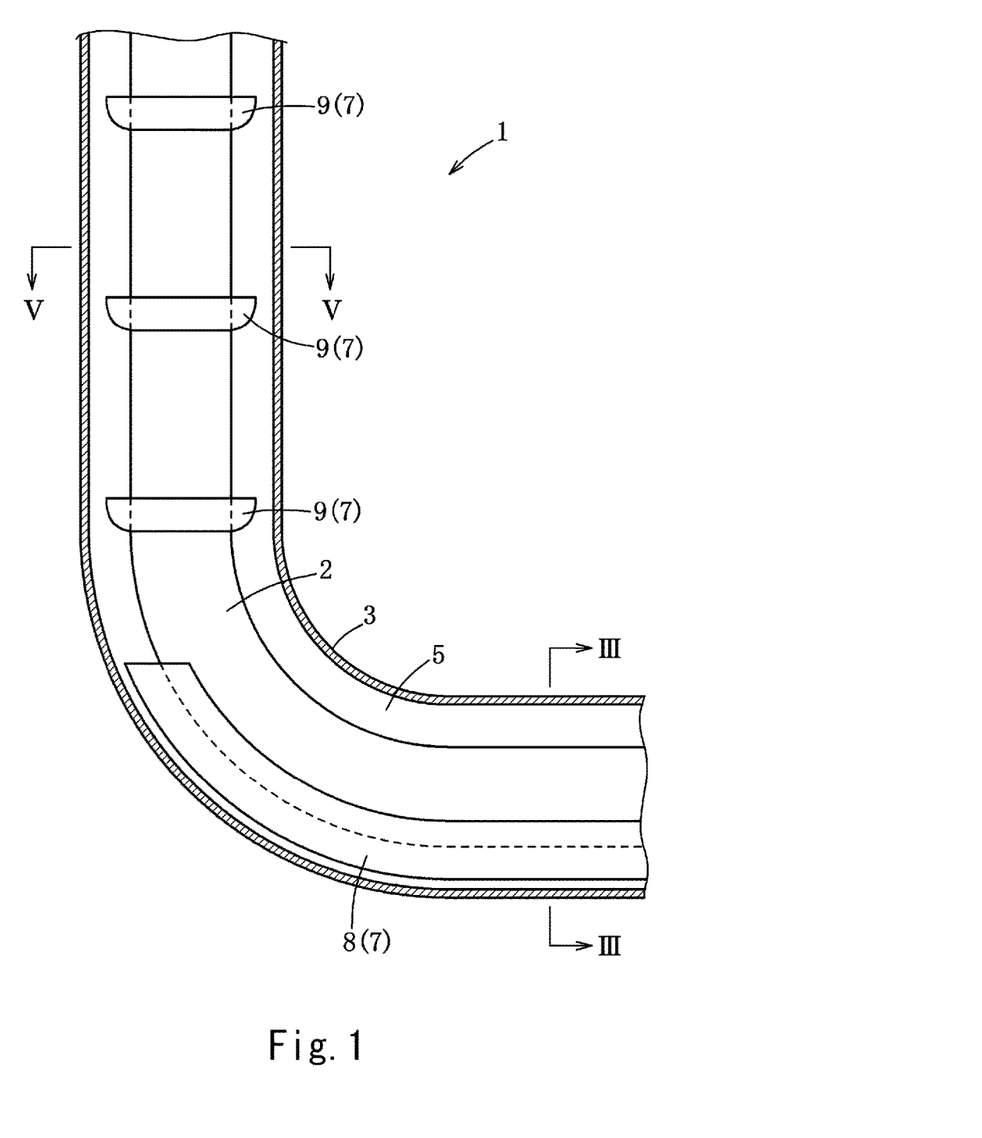
FIG. 1 is a plan view showing a low temperature fluid dual structure pipe according to Embodiment 1 of the present invention.

As shown in FIGS. 1 to 5, the low temperature fluid dual structure pipe 1 includes the receiving member 7 provided in the tubular space between the inner pipe 2 and the outer pipe 3. The receiving member 7 receives at least one of a liquefied inactive gas dropping from the liquefied inactive gas layer 6a formed on the outer peripheral surface of the inner pipe 2 and a solidified inactive gas coming off from the solidified inactive gas layer 6b formed on the outer peripheral surface of the inner pipe 2. The receiving member 7 at least includes: one or a plurality of gutter-shaped receiving trays 8 provided at the inner pipe 2 extending in a horizontal direction; and a plurality of annular receiving trays 9 provided at the inner pipe 2 extending in a vertical direction. FIG. 1 shows a part of one gutter-shaped receiving tray 8 and three of the plurality of annular receiving trays 9.

Next, the gutter-shaped receiving tray 8 will be explained.

Figure 2:
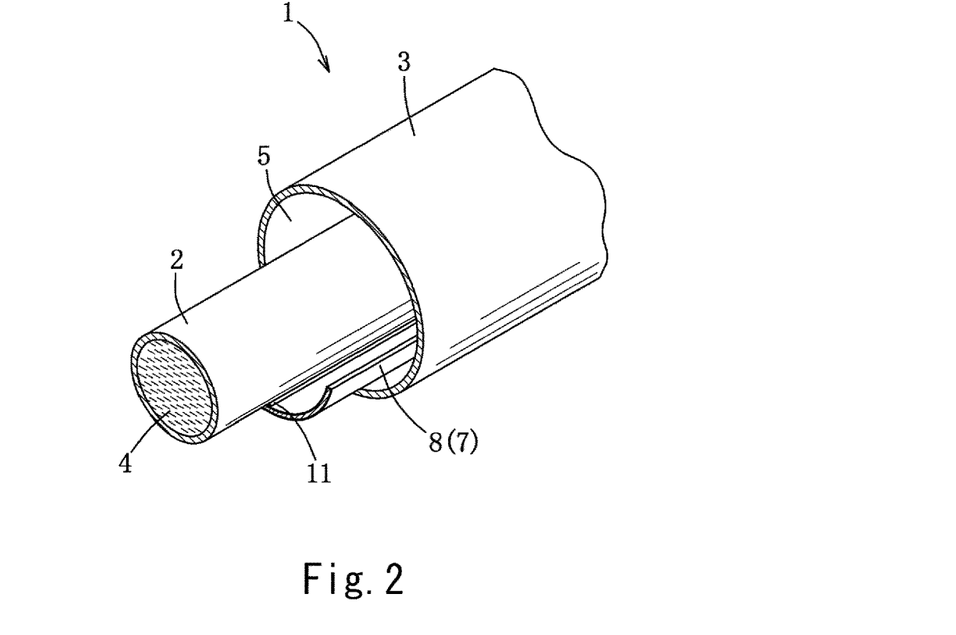
FIG. 2 is a partially cross-sectional perspective view showing the low temperature fluid dual structure pipe.
Figure 3:
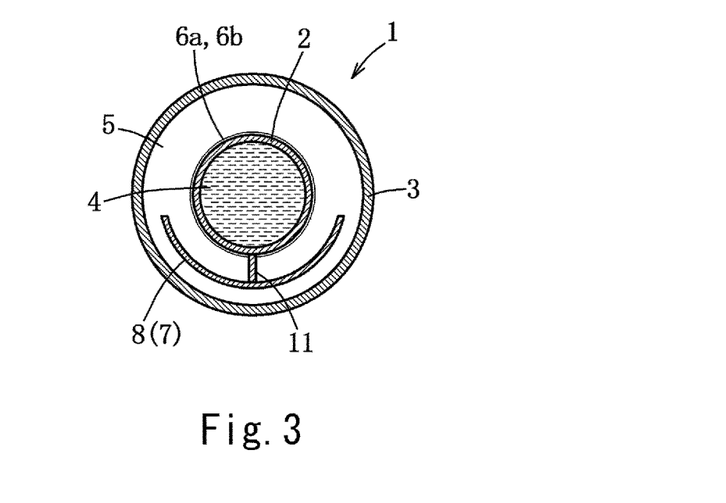
FIG. 3 is a cross-sectional view taken along line III-III of FIG. 1.

As shown in FIGS. 1 to 3, the gutter-shaped receiving tray 8 is provided under the inner pipe 2. The gutter-shaped receiving tray 8 is provided over the entire length of a pipe portion of the inner pipe 2 in a longitudinal direction of the pipe portion, the pipe portion extending in the horizontal direction and an inclination direction. The gutter-shaped receiving tray 8 is formed by bending a thin plate made of stainless steel having excellent heat conduction performance, and a vertical cross section thereof has a semi-circular shape or a U shape.

A support plate member 11 configured to support the gutter-shaped receiving tray 8 and fix the gutter-shaped receiving tray 8 to the inner pipe 2 is provided between the inner pipe 2 and the gutter-shaped receiving tray 8. The support plate member 11 is constituted by one or a plurality of stainless steel band-shaped thin plates provided continuously or intermittently in the longitudinal direction of the inner pipe 2. An upper end portion of the support plate member 11 is joined to a lower end portion of the outer peripheral surface of the inner pipe 2, and a lower end portion of the support plate member 11 is joined to a middle portion of an upper surface of the gutter-shaped receiving tray 8.

A curvature of the gutter-shaped receiving tray 8 is set to be smaller than a curvature of the inner pipe 2 and larger than a curvature of the outer pipe 3. Both radial end portions (upper end portions) of the gutter-shaped receiving tray 8 are provided so as to be located slightly lower than a height position of a center axis of the inner pipe 2.

Next, the annular receiving tray 9 will be explained.

Figure 4:
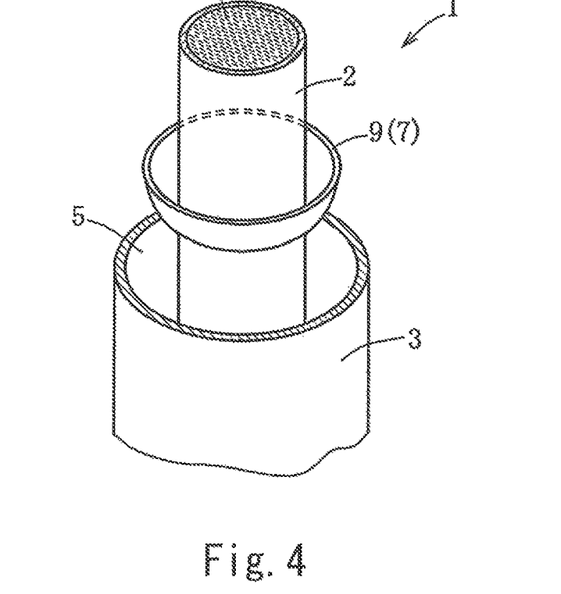
FIG. 4 is a partially cross-sectional perspective view showing the low temperature fluid dual structure pipe.
Figure 5:
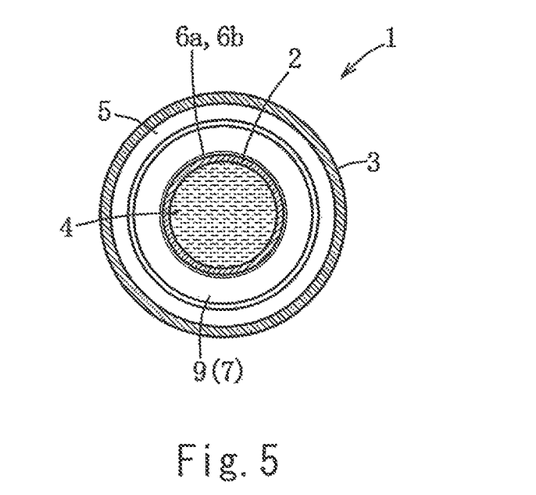
FIG. 5 is a cross-sectional view taken along line V-V of FIG. 1.

As shown in FIGS. 1, 4, and 5, the plurality of annular receiving trays 9 are provided at an outer peripheral portion of the inner pipe 2 at appropriate intervals in a length direction of the inner pipe 2 extending in the vertical direction and also provided in the tubular space between the inner pipe 2 and the outer pipe 3. Each of the annular receiving trays 9 is an annular body that has a circular shape in a plan view. Each of the annular receiving trays 9 is constituted by an outer peripheral side portion of a flat cup-shaped body, and an inner peripheral edge thereof is fixed to the outer peripheral portion of the inner pipe 2. To be specific, each of the annular receiving trays 9 is provided so as to overhang from the outer peripheral portion of the inner pipe 2 outward in a radial direction of the inner pipe 2.

Next, actions and effects of the low temperature fluid dual structure pipe 1 will be explained.

The inactive gas having the melting point and the boiling point each of which is equal to or higher than the temperature of the low temperature fluid 4 is filled in the tubular space between the inner pipe 2 and the outer pipe 3. When the low temperature fluid 4 flows through the inner pipe 2, the inactive gas is liquefied or solidified, and therefore, at least one of the liquefied inactive gas layer 6a and the solidified inactive gas layer 6b is formed on the outer peripheral surface of the inner pipe 2. As a result, the pseudo vacuum layer 5 that is in a substantially vacuum state is formed in the tubular space. Therefore, by the pseudo vacuum layer 5 having a simple structure, convective heat transfer in the tubular space can be prevented, and the heat insulation performance can be secured.

When the low temperature fluid 4 flows through the inner pipe 2, the inactive gas filled in the tubular space and having the melting point and the boiling point each of which is equal to or higher than the temperature of the low temperature fluid 4 is cooled and therefore liquefied or solidified.

Then, the liquefied or solidified inactive gas coagulates on or adheres on the outer peripheral surface of the inner pipe 2 to form at least one of the liquefied inactive gas layer 6a and the solidified inactive gas layer 6b. Therefore, a pseudo vacuum state in the tubular space can be easily realized without using a vacuum pump, and labor and cost can be reduced as compared to a case where vacuum drawing is performed.

When the low temperature fluid 4 does not flow through the inner pipe 2, the inactive gas layer formed by the inactive gas is formed in the tubular space between the inner pipe 2 and the outer pipe 3. Therefore, gas pressure acts on the outer pipe 3 from inside, so that intrusion of outside air into the outer pipe 3 can be prevented. Further, after the damaged low temperature fluid dual structure pipe 1 is repaired, it is only necessary to fill the tubular space between the inner pipe 2 and the outer pipe 3 with the inactive gas.

The low temperature fluid dual structure pipe 1 includes the receiving member 7 configured to receive at least one of the liquefied inactive gas dropping from the liquefied inactive gas layer 6a formed on the outer peripheral surface of the inner pipe 2 and the solidified inactive gas coming off from the solidified inactive gas layer 6b formed on the outer peripheral surface of the inner pipe 2. Therefore, the outer pipe 3 subjected to normal temperature can be prevented from directly contacting at least one of the liquefied inactive gas and the solidified inactive gas, and the deterioration of the vacuum state of the pseudo vacuum layer 5 by vaporization of at least one of the liquefied inactive gas and the solidified inactive gas can be prevented. Further, since the receiving member 7 is cooled by the low temperature fluid 4 through the inner pipe 2, the vaporization of at least one of the liquefied inactive gas and the solidified inactive gas received by the receiving member 7 can be prevented.

The gutter-shaped receiving tray 8 is provided in the space under the inner pipe 2 so as to be able to be heat-exchangeable with the inner pipe 2. Therefore, the gutter-shaped receiving tray 8 can surely receive at least one of the liquefied inactive gas dropping downward from the liquefied inactive gas layer 6a formed on the outer peripheral surface of the inner pipe 2 and the solidified inactive gas coming off from the solidified inactive gas layer 6b formed on the outer peripheral surface of the inner pipe 2. Further, since the gutter-shaped receiving tray 8 is connected to the inner pipe 2 by one or a plurality of support plate members 11 so as to be able to be heat-exchangeable with the inner pipe 2, the vaporization of at least one of the liquefied inactive gas and the solidified inactive gas accumulated in the receiving tray 8 can be prevented.

The plurality of annular receiving trays 9 are provided at the outer peripheral portion of the inner pipe 2 at appropriate intervals in the length direction of the inner pipe 2 extending in the vertical direction, and the inner peripheral edges thereof are joined to the outer peripheral portion of the inner pipe 2. Therefore, the annular receiving trays 9 can surely receive at least one of the liquefied inactive gas dropping along the outer peripheral surface of the inner pipe 2 from the liquefied inactive gas layer 6a formed on the outer peripheral surface of the inner pipe 2 and the solidified inactive gas coming off along the outer peripheral surface of the inner pipe 2 from the solidified inactive gas layer 6b formed on the outer peripheral surface of the inner pipe 2. Further, the inner peripheral edges of the annular receiving trays 9 are joined to the inner pipe 2 so as to be able to be heat-exchangeable with the inner pipe 2. Therefore, the vaporization of at least one of the liquefied inactive gas and the solidified inactive gas accumulated in the annular receiving trays 9 can be prevented.

Embodiment 2

Next, an entire configuration of a low temperature fluid dual structure storage tank 21 will be explained.

Figure 6:
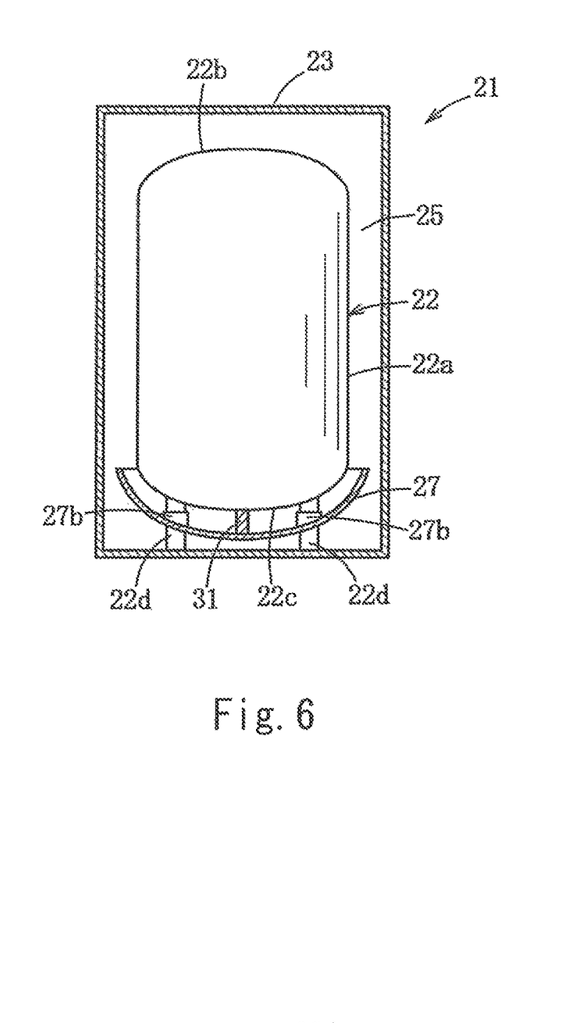
FIG. 6 is a front view showing a low temperature fluid dual structure storage tank according to Embodiment 2.

As shown in FIG. 6, the low temperature fluid dual structure storage tank 21 includes an inner tank 22 and an outer tank 23 externally fitted to the inner tank 22 with a sealed space therebetween. In the low temperature fluid dual structure storage tank 21, when a low temperature fluid (such as liquefied helium or liquefied hydrogen) is stored in the inner tank 22, a pseudo vacuum layer 25 that is in a substantially vacuum state is formed in the sealed space between the inner tank 22 and the outer tank 23.

The inner tank 22 is made of, for example, stainless steel and is formed integrally by: a substantially cylindrical body portion 22a; an upper mirror plate portion 22b welded and joined to an upper end of the body portion 22a; and a lower mirror plate portion 22c welded and joined to a lower end of the body portion 22a. However, the shape of the inner tank 22 is not especially limited and may be changed suitably. Similarly, the outer tank 23 is made of, for example, stainless steel or aluminum alloy and is formed in a box shape. However, the shape of the outer tank 23 is not especially limited and may be changed suitably.

The inner tank 22 includes a plurality of supporting legs 22d extending downward from a bottom portion of the inner tank 22. The plurality of supporting legs 22d are provided at an outer peripheral portion of the lower mirror plate portion 22c of the inner tank 22 so as to be located at trisection positions in a circumferential direction of the outer peripheral portion of the lower mirror plate portion 22c. Each of the supporting legs 22d is configured as a vertically long block body made of a thin steel plate.

An inactive gas (such as nitrogen gas) having a melting point and a boiling point each of which is equal to or higher than a temperature of the low temperature fluid is filled in the space between the inner tank 22 and the outer tank 23. When the low temperature fluid is stored in the inner tank 22, the inactive gas is liquefied or solidified, and therefore, at least one of a liquefied inactive gas layer and a solidified inactive gas layer is formed on an outer peripheral surface of the inner tank 22. As a result, the pseudo vacuum layer 25 is formed.

Figure 7:
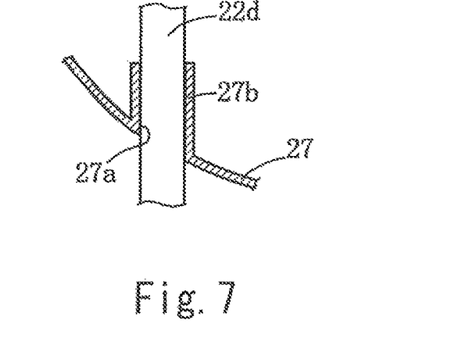
FIG. 7 is an enlarged cross-sectional view showing a part of FIG. 6.

As shown in FIGS. 6 and 7, the low temperature fluid dual structure storage tank 21 includes a receiving member 27 provided between the inner tank 22 and the outer tank 23. The receiving member 27 receives at least one of a liquefied inactive gas dropping from the liquefied inactive gas layer formed on the outer peripheral surface of the inner tank 22 and a solidified inactive gas coming off from the solidified inactive gas layer formed on the outer peripheral surface of the inner tank 22. The receiving member 27 is constituted by a receiving tray provided under the inner tank 22. The receiving tray is formed by bending a thin plate made of stainless steel and has a partially spherical shape.

A stainless steel supporting portion 31 configured to support the receiving member 27 and fix the receiving member 27 to the inner tank 22 is provided between the inner tank 22 and the receiving member 27. An upper end portion of the supporting portion 31 is joined to a lower end portion of the lower mirror plate portion 22c of the inner tank 22, and a lower end portion of the supporting portion 31 is joined to a middle portion of an upper surface of the receiving member 27.

Further, the inner tank 22 is supported by three supporting legs 22d made of, for example, GFRP (glass fiber reinforced plastic) having an excellent heat insulating property. Opening portions 27a are formed on the receiving member 27 so as to correspond to the plurality of supporting legs 22d. Tubular portions 27b projecting upward are formed at peripheral edges of the opening portions 27a, respectively. The three supporting legs 22d are inserted through the tubular portions 27a and the opening portions 27b, and lower end portions thereof are fixed to an upper end surface of a bottom plate of the outer tank 23.

Next, actions and effects of the low temperature fluid dual structure storage tank 21 will be explained.

The inactive gas having the melting point and the boiling point each of which is equal to or higher than the temperature of the low temperature fluid is filled in the space between the inner tank 22 and the outer tank 23. When the low temperature fluid is stored in the inner tank 22, the inactive gas is liquefied or solidified, and therefore, at least one of the liquefied inactive gas layer and the solidified inactive gas layer is formed on the outer peripheral surface of the inner tank 22. As a result, the pseudo vacuum layer 25 that is in a substantially vacuum state is formed in the space. Therefore, by the pseudo vacuum layer 25 having a simple structure, the convective heat transfer in the space can be prevented, and the heat insulation performance can be secured.

The low temperature fluid is stored in the inner tank 22, and the inactive gas filled in the space and having the melting point and the boiling point each of which is equal to or higher than the temperature of the low temperature fluid is cooled and therefore liquefied or solidified. Then, the liquefied or solidified inactive gas coagulates on or adheres on the outer peripheral surface of the inner tank 22 to form at least one of the liquefied inactive gas layer and the solidified inactive gas layer. Therefore, the pseudo vacuum state in the space can be easily realized without using the vacuum pump.

When the low temperature fluid is not stored in the inner tank 22, an inactive gas layer formed by the inactive gas is formed in the space between the inner tank 22 and the outer tank 23. Therefore, gas pressure acts on the outer tank 23 from inside, so that intrusion of outside air into the outer tank 23 can be prevented. Further, after the damaged dual structure pipe is repaired, it is only necessary to fill the space between the inner tank 22 and the outer tank 23 with the inactive gas. Therefore, labor and cost can be reduced as compared to a case where vacuum drawing is performed.

The low temperature fluid dual structure storage tank 21 includes the receiving member 27 configured to receive at least one of the liquefied inactive gas dropping from the liquefied inactive gas layer formed on the outer peripheral surface of the inner tank 22 and the solidified inactive gas coming off from the solidified inactive gas layer formed on the outer peripheral surface of the inner tank 22. Therefore, at least one of the liquefied inactive gas and the solidified inactive gas can be prevented from directly contacting the outer tank 23 having normal temperature, and the deterioration of the vacuum state of the pseudo vacuum layer 25 can be prevented. Further, since the receiving member 27 is cooled by the low temperature fluid through the inner tank 22, the vaporization of at least one of the liquefied inactive gas and the solidified inactive gas received by the receiving member 27 can be prevented.

Next, partially modified versions of Embodiments 1 and 2 will be explained.

A heat insulating material, such as a synthetic resin foaming body or an interfiber air layer heat insulating material, may be provided at a rear surface side of each of the receiving members 7 and 27 of Embodiments 1 and 2. According to this structure, the inactive gas does not adhere on the rear surface side of each of the receiving members 7 and 27, and therefore, the liquefied inactive gas layer and the solidified inactive gas layer are not formed. On this account, the liquefied inactive gas does not drop downward from the receiving members 7 and 27, and the solidified inactive gas does not come off from the receiving members 7 and 27. Thus, the vacuum states of the pseudo vacuum layers 5 and 25 can be more surely maintained.

According to the receiving member 7 of Embodiment 1, the gutter-shaped receiving tray 8 is connected to the inner pipe 2 through one or a plurality of support plate members 11 so as to be able to be heat-exchangeable with the inner pipe 2. However, the gutter-shaped receiving tray 8 may be directly connected to the inner pipe 2 without through the support plate members 11.

Further, a skilled person can realize embodiments including various modifications made to Embodiments 1 and 2 within the scope of the present invention, and the present invention includes such modified embodiments.

REFERENCE SIGNS LIST 1 low temperature fluid dual structure pipe
2 inner pipe
3 outer pipe
4 low temperature fluid
5, 25 pseudo vacuum layer
6 solidified inactive gas layer
7, 27 receiving member
8 gutter-shaped receiving tray
9 annular receiving tray
21 low temperature fluid dual structure storage tank
22 inner tank
23 outer tan

The invention claimed is:
1. A low temperature fluid dual structure pipe comprising:
an inner pipe through which a low temperature fluid flows;
an outer pipe externally fitted to the inner pipe with a sealed tubular space therebetween; and
a receiving member provided between the inner pipe and the outer pipe, wherein:
an inactive gas having a melting point and a boiling point each of which is equal to or higher than a temperature of the low temperature fluid is filled in the tubular space between the inner pipe and the outer pipe;
when the low temperature fluid flows through the inner pipe, the inactive gas is liquefied or solidified, and therefore, at least one of a liquefied inactive gas layer and a solidified inactive gas layer is formed on an outer peripheral surface of the inner pipe, and as a result, a pseudo vacuum layer that is in a substantially vacuum state is formed in the tubular space; and
the receiving member receives at least one of (i) a liquefied inactive gas dropping from the liquefied inactive gas layer formed on the outer peripheral surface of the inner pipe or (ii) a solidified inactive gas coming off from the solidified inactive gas layer formed on the outer peripheral surface of the inner pipe.

2. The low temperature fluid dual structure pipe according to claim 1, wherein the receiving member is provided under the inner pipe so as to be heat-exchangeable with the inner pipe.

3. The low temperature fluid dual structure pipe according to claim 1, wherein the receiving member includes a plurality of annular receiving trays which are provided at the outer peripheral portion of the inner pipe at appropriate intervals in a length direction of the inner pipe extending in a vertical direction, inner peripheral edges of the plurality of annular receiving trays being fixed to the outer peripheral portion of the inner pipe.

4. The low temperature fluid dual structure pipe according to claim 1, wherein:
   the low temperature fluid is any of liquefied helium and liquefied hydrogen; and
   the inactive gas is carbon dioxide.

5. A low temperature fluid dual structure storage tank comprising:
   an inner tank configured to store a low temperature fluid;
   an outer tank externally fitted to the inner tank with a sealed space therebetween; and
   a receiving member provided between the inner tank and the outer tank, wherein:
   an inactive gas having a melting point and a boiling point each of which is equal to or higher than a temperature of the low temperature fluid is filled in the space between the inner tank and the outer tank;
   when the low temperature fluid is stored in the inner tank, the inactive gas is liquefied or solidified, and therefore, at least one of a liquefied inactive gas layer and a solidified inactive gas layer is formed on an outer peripheral surface of the inner tank, and as a result, a pseudo vacuum layer that is in a substantially vacuum state is formed in the sealed space; and
   the receiving member receives at least one of (i) a liquefied inactive gas dropping from the liquefied inactive gas layer formed on the outer peripheral surface of the inner tank or (ii) a solidified inactive gas coming off from the solidified inactive gas layer formed on the outer peripheral surface of the inner tank.

6. The low temperature fluid dual structure pipe according to claim 1, wherein:
   the low temperature fluid is any of liquefied helium and liquefied hydrogen; and
   the inactive gas is carbon dioxide.

7. The low temperature fluid dual structure pipe according to claim 2, wherein:
   the low temperature fluid is any of liquefied helium and liquefied hydrogen; and
   the inactive gas is carbon dioxide.

8. The low temperature fluid dual structure pipe according to claim 3, wherein:
   the low temperature fluid is any of liquefied helium and liquefied hydrogen; and
   the inactive gas is carbon dioxide.

* * * * *